No. 646,443. Patented Apr. 3, 1900.
T. F. MAGUIRE & R. E. GLOVER.
MAIL BAG CATCHER AND DELIVERER.
(Application filed Aug. 22 1898. Renewed Feb. 24, 1900.)
(No Model.) 2 Sheets—Sheet 1.
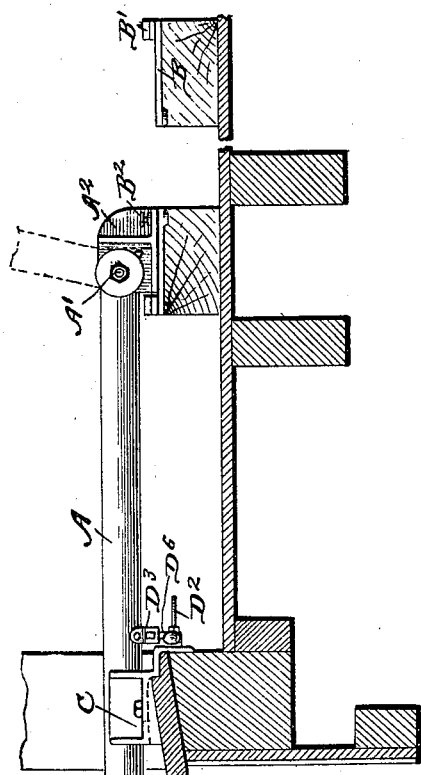
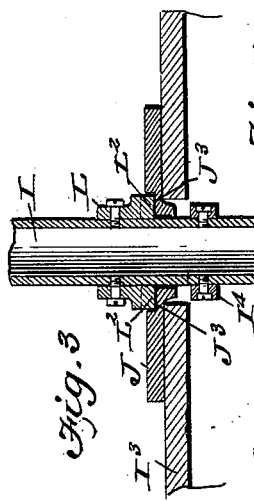
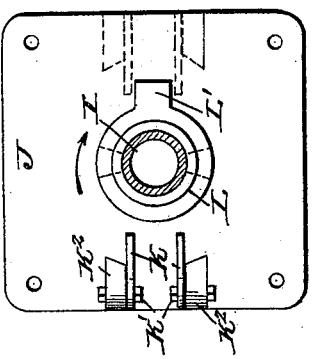
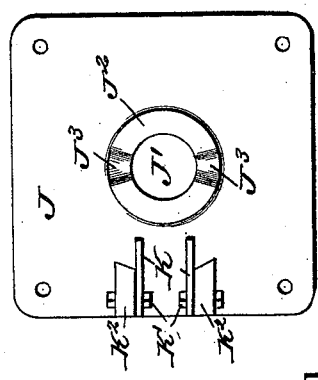
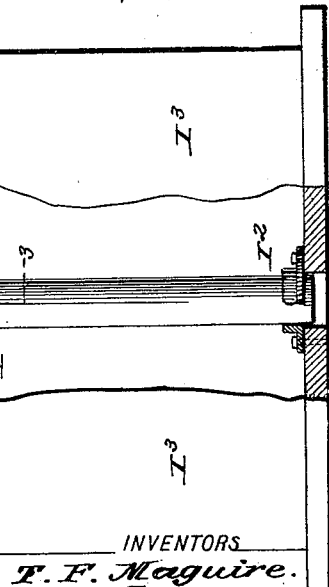
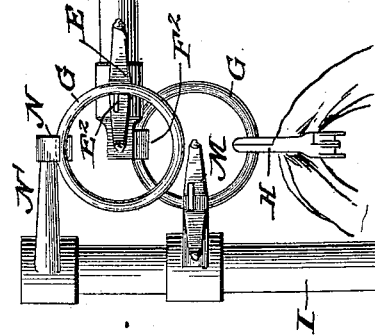
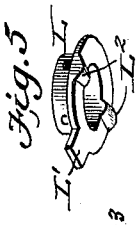
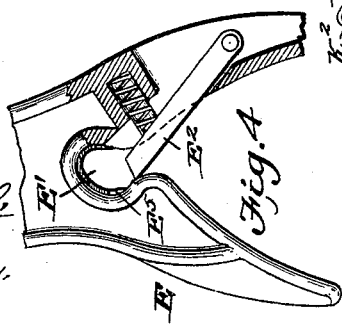
WITNESSES:
INVENTORS
T. F. Maguire.
R. E. Glover.
BY
ATTORNEYS.
THE NORRIS PETERS CO., PHOTO-LITHO., WASHINGTON, D. C.

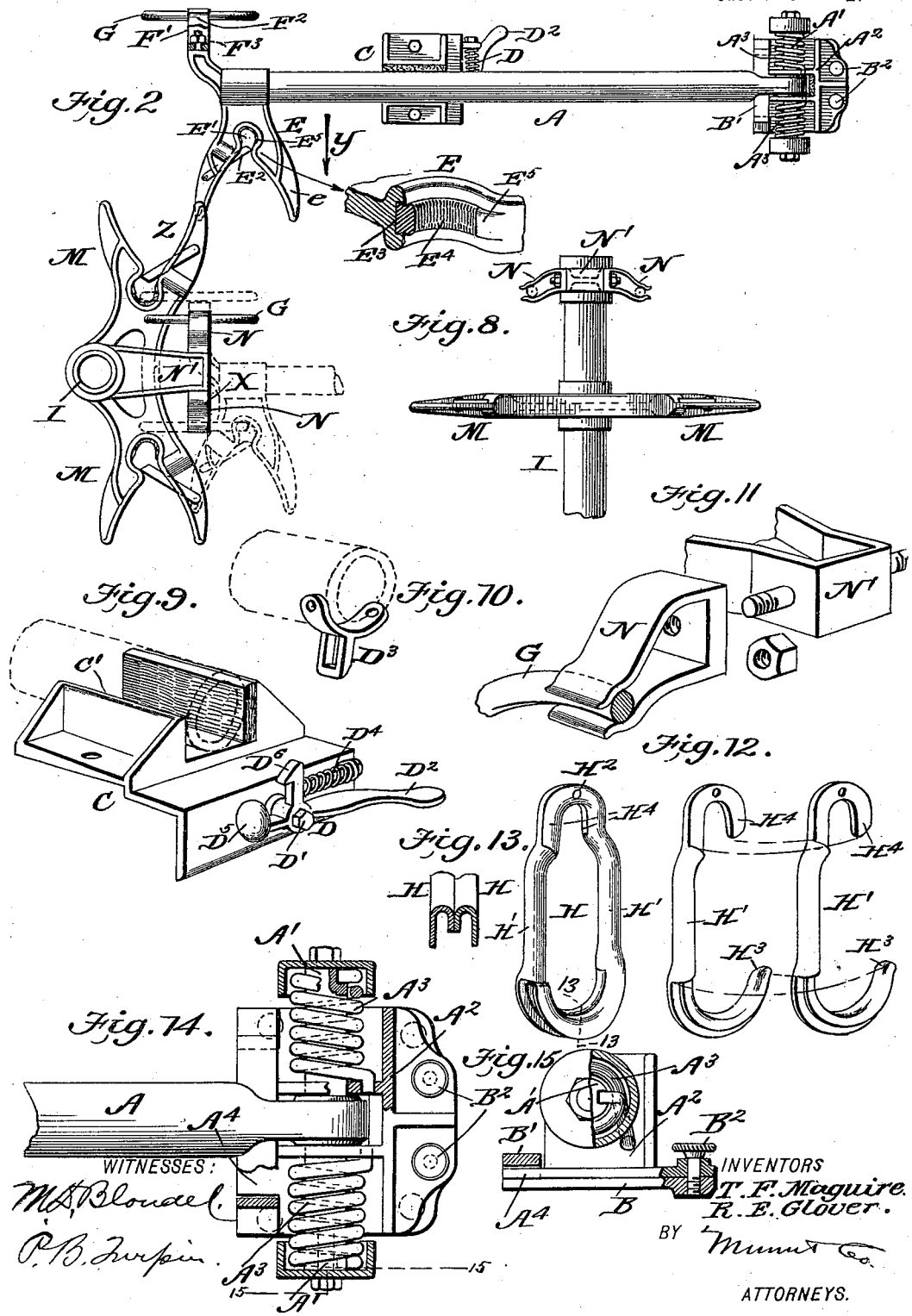

UNITED STATES PATENT OFFICE.

THOMAS FERRALL MAGUIRE AND ROBERT EDWARD GLOVER, OF PORTSMOUTH, VIRGINIA.

MAIL-BAG CATCHER AND DELIVERER.

SPECIFICATION forming part of Letters Patent No. 646,443, dated April 3, 1900.

Application filed August 22, 1898. Renewed February 24, 1900. Serial No. 6,412. (No model.)

*To all whom it may concern:*

Be it known that we, THOMAS FERRALL MAGUIRE and ROBERT EDWARD GLOVER, residing at Portsmouth, in the county of Norfolk and State of Virginia, have invented a new and useful Improvement in Mail-Bag Catchers and Deliverers, of which the following is a specification.

This invention is an improvement in devices for delivering mail-bags from moving trains and for catching such bags by the train; and the invention consists in certain novel constructions and combinations of parts, as will be hereinafter described, and pointed out in the claims.

In the drawings, Figure 1 is a sectional elevation of our improvements. Fig. 2 is a top plan view thereof. Fig. 3 is a detail vertical section on about line 3 3 of Fig. 1. Fig. 4 is a detail top plan view of the bag-catcher, partly in section. Fig. 5 is a detail perspective view of the stop-collar on the standard. Figs. 6 and 7 are top plan views of the stop-plate for the standard, the standard and stop-collar being shown in Fig. 7. Fig. 8 is a side view of the upper portion of the standard. Fig. 9 is a detail view illustrating the seat for the swinging arm. Fig. 10 is a detail view of the staple on the swinging arm, the latter being indicated in dotted lines. Fig. 11 is a detail view illustrating one of the ring-holders and the support therefor on the standard. Fig. 12 illustrates in perspective the bag-suspending link. Fig. 13 is a detail cross-section on about line 13 13 of Fig. 12. Fig. 14 is a top plan view, partly in section, illustrating the pivot-plate for the swinging arm and the base-plate or holder for same; and Fig. 15 is a detail cross-section on about line 15 15 of Fig. 14.

In carrying out our invention we provide in the car and on the land alongside the track means for delivering and receiving the mail-bag, so the same device in the car may deliver the package of mail to and receive a package of mail from a similar device on the track or land adjacent to the track, the construction of which will be described in detail.

One feature of our invention consists in a vertically-swinging arm A, pivotally supported at one end in the car adjacent to the doorway and arranged to swing out of the doorway in position to receive a mail-bag held alongside the moving train and to deliver a mail-bag to a suitable receiver alongside the moving train. This arm, as will be understood, swings through the open doorway, and to provide for its use at either side of the car we connect its pivoted end detachably with the car, so it may be shifted from side to side to operate through either doorway. In carrying out this feature of our invention we provide the arm A at its inner end with a shaft $A'$, rigid with the arm A and pivoted in a pivot-plate $A^2$ and engaged by springs $A^3$, which aid in lifting the arm A in the operation of the device, such springs being engaged with the pivot-plate $A^2$ and with the shaft $A'$ and held by the end caps and nuts, as will be understood from Fig. 14. The pivot-plate has at one end a projecting portion $A^4$, which fits in the box-loop $B'$ on the base-plate B, the other end of the pivot-plate being held to the base-plate by the set screw or screws $B^2$, as will be understood from Figs. 14 and 15. This construction permits the ready removal of the pivot-plate from one of the base-plates B and its application to the other one of such base-plates. In this connection it should be understood that we provide in the car in proper relation to the opposite doorway these base-plates B, so the arm may be shifted from side to side, the two base-plates being shown in Fig. 1 of the drawings.

In the car adjacent to each doorway we provide a seat-plate C for the swinging arm, the construction of which plate is best shown in Fig. 9, from which it will be seen the plate has in its upper face a recess $C'$ to receive the arm, one side of which is lined with the leather or other cushion to ease the blow as the arm catches a bag from the holder alongside the moving train. A latch D, pivoted at $D'$ and having a treadle $D^2$, is arranged to engage with the arm, preferably with a staple $D^3$ thereon, the latch being actuated by a spring $D^4$ or a weight $D^5$, or both, into engagement with the staple $D^3$, the head $D^6$ being beveled so the staple may move into engagement with the latch, as will be understood from Fig. 9. As the swinging arm is lowered into operative position, as shown in Fig. 1, it will be engaged and held by the latch D, and yet may be readily released when desired by simply pressing on the handle D² with the foot. It is manifest that the springs A³ may be adjusted to vary the tension on the arm A. At its outer end the arm A is provided with the receiver E and the discharger F, the former being in the nature of a fork which opens toward one end of the car, while the latter is in the nature of a clasp opening toward the opposite end of the car, so the discharger and receiver may be referred to as facing in opposite directions. The receiver E has tines e, which converge inwardly and have between their inner ends a recess E', which is guarded by the spring-actuated tongue E². The rear wall of the recess E' is provided with a horizontal groove E³, which receives a rubber or other cushioning-strip E⁴, which projects slightly into the recess E' and abuts at its ends against shoulders E⁵, which hold it steadily to its place. This cushion receives the blow of the ring caught by the receiver, and so eases the jar and avoids injury and wear of the parts.

The clasp F' has the spring-jaws F² to receive the ring connected with the mail-sack which is to be delivered from the car, and such clasp may preferably be swiveled to its support, as indicated at F³, so it may turn slightly in lowering the arm out of the car, and thus prevent any twisting of the bag-supporting ring in adjusting the devices from within the car to a position for use, as shown in Fig. 1.

We have so far described the devices arranged on the car and, as shown in Figs. 1 and 2, in connection with those on the land, and before passing to a description of the parts on the land it may be well to say that in practice we prefer to support the mail-bag to be received by and to be discharged from the devices on the car before described by means of a ring G and a link H, the ring G being a continuous ring, which may, if desired, be flattened slightly where it enters the clasp, while the link H is made in sections H', which are pivoted together at H², have overlapping portions H³ at their lower ends and overlapping portions H⁴ at their upper ends. The lower overlapping portions H³ are upturned at their extremities and are preferably broadened on their upper sides and rounded on such edges to furnish a broad bearing for the bag to avoid injury thereto and are channeled on their under sides to reduce weight. These links are suspended from the rings and are adapted to be opened to permit their application to the rings and to properly receive and hold the mail-bag, as will be understood from the drawings.

The devices on the land include an upright shaft I, journaled at I' in a supporting-bearing and at I² in a guide or steady bearing in a suitable framing I³. The lower guide-bearing I² consists of a collar-like plate secured to the framing and having an opening in which the shaft I is loosely fitted. The bearing I' includes a stop-plate J, secured on the framing, provided with an opening J' for the shaft and an upwardly-projecting collar J², which is provided with diametrically-opposite depressions or notches J³, such notches J³ extending, preferably, down into the body of the plate. Latches K are also pivoted to the plate J at K', preferably to lugs K², the latches K being spaced apart and adapted to receive between them a lug L' on the stop-collar L, presently described. Where desired, the latches K may be arranged at both sides of the plate J, as will be understood from the full-line and dotted-line illustration in Fig. 7. The stop-collar L is secured on the shaft I and bears upon the flange J², being provided on its under side with depending teeth L², which enter the notches J³, and having the lug L' to engage and be stopped by one or the other of the latches K. A stop-collar I⁴ is secured upon the shaft I below the plate J and limits the upward movement of the shaft, permitting sufficient movement of the shaft for the teeth L² to escape from the notches J³, as will be understood from what follows. If the parts be in the position shown in Fig. 7 and the upper latch K be thrown back and the shaft be turned in the direction indicated by the arrow shown in Fig. 7, the lug L' will strike against the lower latch K and be stopped thereby, and a similar operation will result if the lower latch K be thrown back and the shaft be turned in the reverse direction. The purpose of this construction is to permit the shaft I to be turned a half-revolution when it receives or discharges a mail-bag and to be stopped in such position so the bags will be carried to the side of the shaft I opposite the moving train and be stopped in such position. This result may to a certain extent be accomplished by the teeth L² and the notches J³ or by the latches K alone; but it is preferred to use both said constructions, because the latch K positively stops the shaft in the desired position and the teeth L² and notches J³ serve to prevent any rebound of the shaft.

On the shaft I we provide the bag-receivers M M and the bag-dischargers N N, the receivers M being similar to the receiver E, before described, and the dischargers N being similar to the discharger F, except that they need not be swiveled. The dischargers N are arranged above the receivers M and are preferably supported on a radial arm N', being secured thereto in the manner illustrated in Fig. 11. It is preferred to provide the receivers and the dischargers on the shaft I in pairs, projecting in opposite directions, as will be understood from Fig. 2.

In the practical operation of our invention the shaft I is so arranged relatively to the track and to the receiving and discharging devices on the arm A that the inner tine of the receivers M on the shaft I, the dischargers on said shaft, the discharger on the arm A, and the outer tine of the receiver on the arm A all lie in a common vertical plane, as is clearly shown in Fig. 2, so that if a bag be suspended on the discharger of the arm A and one on the proper discharger of the shaft I, such discharger being indicated by X in Fig. 2, and the car be moving in the direction indicated by the arrow Y in such figure the outer tine of the receiver of the arm A will strip the bag-supporting ring from said discharger X and deliver said ring into the recess E' of the receiver E, and at the same time the discharger on said arm A will deliver its bag-supporting ring to the tine of the shaft I, (indicated by Z in Fig. 2.) This delivery of the bag to said receiver will operate to give the shaft I a half-revolution, throwing the bag supported on said shaft away from the track, when the bag can be removed with safety and the shaft be readjusted to position for use, the stop and latch devices before described operating to stop the shaft in proper position for use and avoiding any error in setting the bag to be caught by the train or the receiving devices to properly take the bag from said train. The double arrangement of latches K (indicated in Fig. 7 and before described) may be useful when the shaft I is supported between two tracks and is designed to operate in connection with devices on trains operating on both such tracks. We make the rings G large enough to compensate for slight differences in alinement of the receiving and discharging devices, as may result from the oscillations of the cars.

It will be understood that the arm A not only operates to receive the bag from the dischargers on the shaft I, but also to deliver such bag by the raising of the arm into the car.

Having thus described our invention, what we claim, and desire to secure by Letters Patent, is—

1. The combination of the swinging arm, the pivot-plate to which said arm is connected, the base-plate having a box-loop to receive a portion of the pivot-plate and the set screw or screws coöperating with said box-loop in securing the pivot-plate substantially as set forth.

2. In an apparatus substantially as described, a receiver consisting of a fork having tines fixed with relation to each other and converging toward their inner ends and provided at such ends with a recess to receive the bag-supporting ring and in advance of such recess with a latch by which to secure said ring when in the recess, substantially as set forth.

3. In an apparatus substantially as described, a receiver having a recess for the bag-supporting ring and provided therewith a cushion to receive the blow of the entering-ring, and means for securing the ring in said recess, substantially as set forth.

4. In an apparatus substantially as described, the combination of the swinging arm adapted to be lowered through the car-doorway and latch devices for securing the arm when so lowered, such latch devices operating independently of the action of the bag on the arm whereby such bag will not release the latch substantially as set forth.

5. In an apparatus substantially as described, the combination of the swinging arm, a seat-plate adapted to receive said arm when lowered and provided with a cushion for said arm said cushion being arranged in rear of the path in which said arm swings whereby it will receive the back jar of the arm in receiving a bag and means on the arm for receiving and discharging the bag substantially as set forth.

6. The combination substantially as described, of the swinging arm, the seat-plate therefor, having a recess to receive the arm and a cushion at one side of said recess and latch devices on the said seat-plate for securing the arm when lowered, substantially as set forth.

7. In an apparatus substantially as described, the combination of the swinging arm, the plate to which said arm is pivoted, the base-plate, means whereby the pivot-plate is detachably held to the base-plate, the seat-plate having a recess for the arm, a latch for securing the arm, and bag receiving and discharging devices on said arm and facing in opposite directions, substantially as set forth.

8. The combination of the shaft provided with means for handling the mail-bag, the base-plate having a bearing for said shaft and notches in its upper side, the stop-collar on the shaft having teeth entering such notches and means for limiting the endwise movement of the shaft, substantially as set forth.

9. The combination of the shaft provided with means for handling the mail-bag, the base-plate in which said shaft is journaled, the collar or flange thereon having notches, the collar on the shaft having teeth entering said notches and a projecting lug, and latches arranged in the path of said lug, substantially as set forth.

10. The combination of the shaft, the base-plate in which said shaft is journaled, the latches on said plate movable independently into and out of operative position and the lug on the shaft coöperating with said latches, substantially as set forth.

11. In an apparatus substantially as described, a link composed of sections pivoted together and adapted to embrace and secure a bag and having the lower overlapping portions of said sections broadened laterally to furnish a proper bearing for the bag, substantially as set forth.

12. In an apparatus substantially as described, the combination of the shaft, the guide-bearing for the lower end thereof, the plate having the pivoted latches spaced apart and provided with the notches or recesses, the collar on the shaft having teeth entering such notches and provided with a radial lug, and the bag receiving and discharging devices on said shaft, substantially as set forth.

13. In an apparatus substantially as described, the combination of the bag-securing link made in sections pivoted together at one end and having overlapping portions at one end to secure the bag and at the other end to secure the ring, the ring fitted to said link and devices whereby to support the ring and to release same, substantially as set forth.

14. The combination in an apparatus substantially as described of the upright or shaft, the bag-receivers supported thereon facing in opposite directions and having the converging tines, an arm extended from the upright and the bag-dischargers swiveled to said arm and arranged in alinement with the receiving-tines of the bag-receivers substantially as set forth.

THOMAS FERRALL MAGUIRE.
ROBERT EDWARD GLOVER.

Witnesses:
J. C. BURDEN,
H. D. JENKINS.